United States Patent

Burgis

[15] 3,642,113
[45] Feb. 15, 1972

[54] APPARATUS FOR DISCHARGING ARTICLES FROM A MOVING CONVEYOR

[72] Inventor: William J. Burgis, Park Ridge, Ill.
[73] Assignee: Conveyor Systems, Inc., Morton Grove, Ill.
[22] Filed: Aug. 17, 1970
[21] Appl. No.: 64,201

[52] U.S. Cl. ..................................198/25, 198/81, 198/127
[51] Int. Cl. .....................................................B65g 47/00
[58] Field of Search..........................198/25, 38, 21, 81, 127; 193/36

[56] References Cited

UNITED STATES PATENTS

| | | | |
|---|---|---|---|
| 3,018,873 | 1/1962 | Burt | 198/38 |
| 2,360,661 | 10/1944 | Eddy et al | 193/36 |
| 2,613,798 | 10/1952 | McPhee | 198/21 |
| 2,681,130 | 6/1954 | Atwood | 198/21 |

*Primary Examiner*—Evon C. Blunk
*Assistant Examiner*—Hadd S. Lane
*Attorney*—Wallenstein, Spangenberg, Hattis & Strampel

[57] ABSTRACT

Diverting means at each of a number of articles diverting stations of a conveyor comprise a frame supported for rocking motion along an axis extending generally longitudinally of the conveyor below each diverting station. The frame carries first and second sets of continuously driven longitudinally spaced article impelling elements, such as friction wheels respectively moving in opposite directions and positioned on opposite sides of the pivot axis of the frame. Normally, the frame is balanced in a position where both sides of article impelling elements are located below the level of the conveyor. By rocking the frame in one direction or the other from the balanced position, one set or the other of article impelling elements are raised above the level of the conveyor to impel an article thereon in one direction or the other to an article receiving point on one side or the other of the conveyor.

9 Claims, 10 Drawing Figures

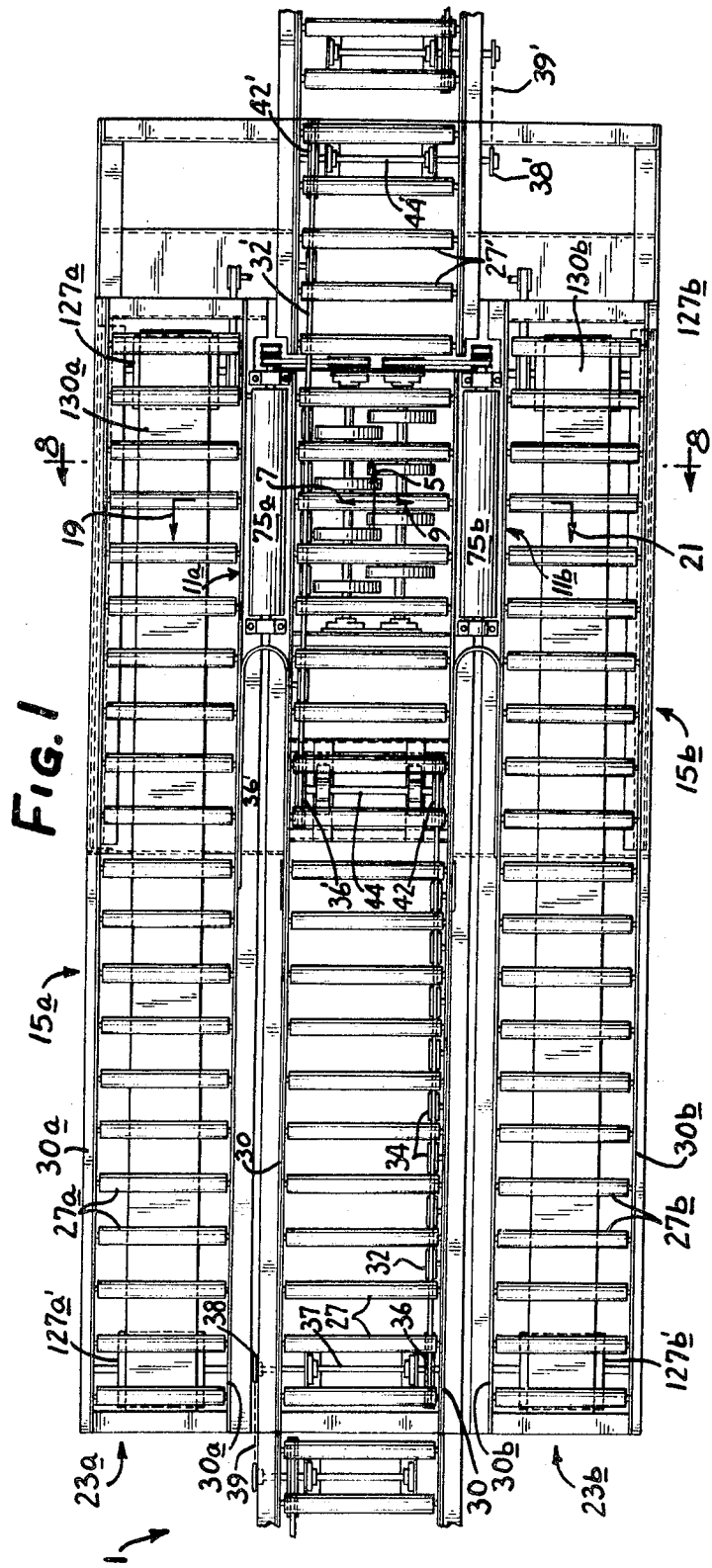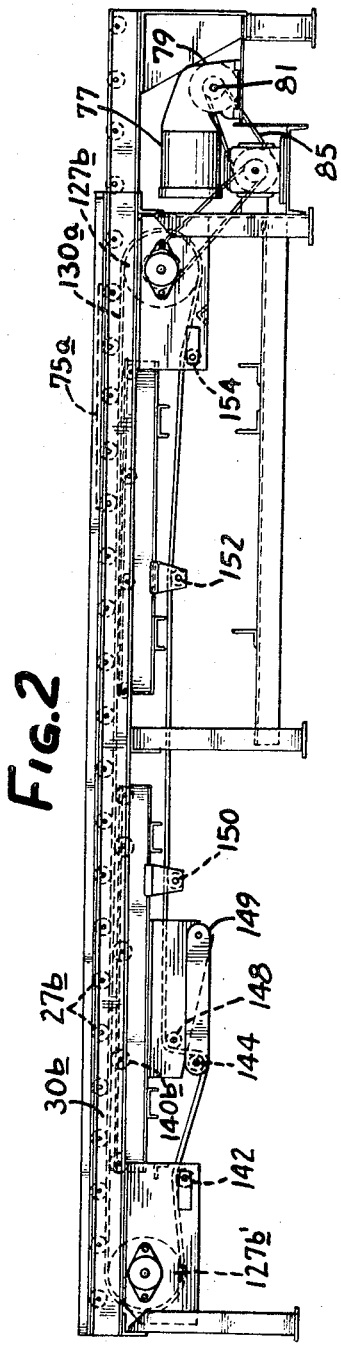

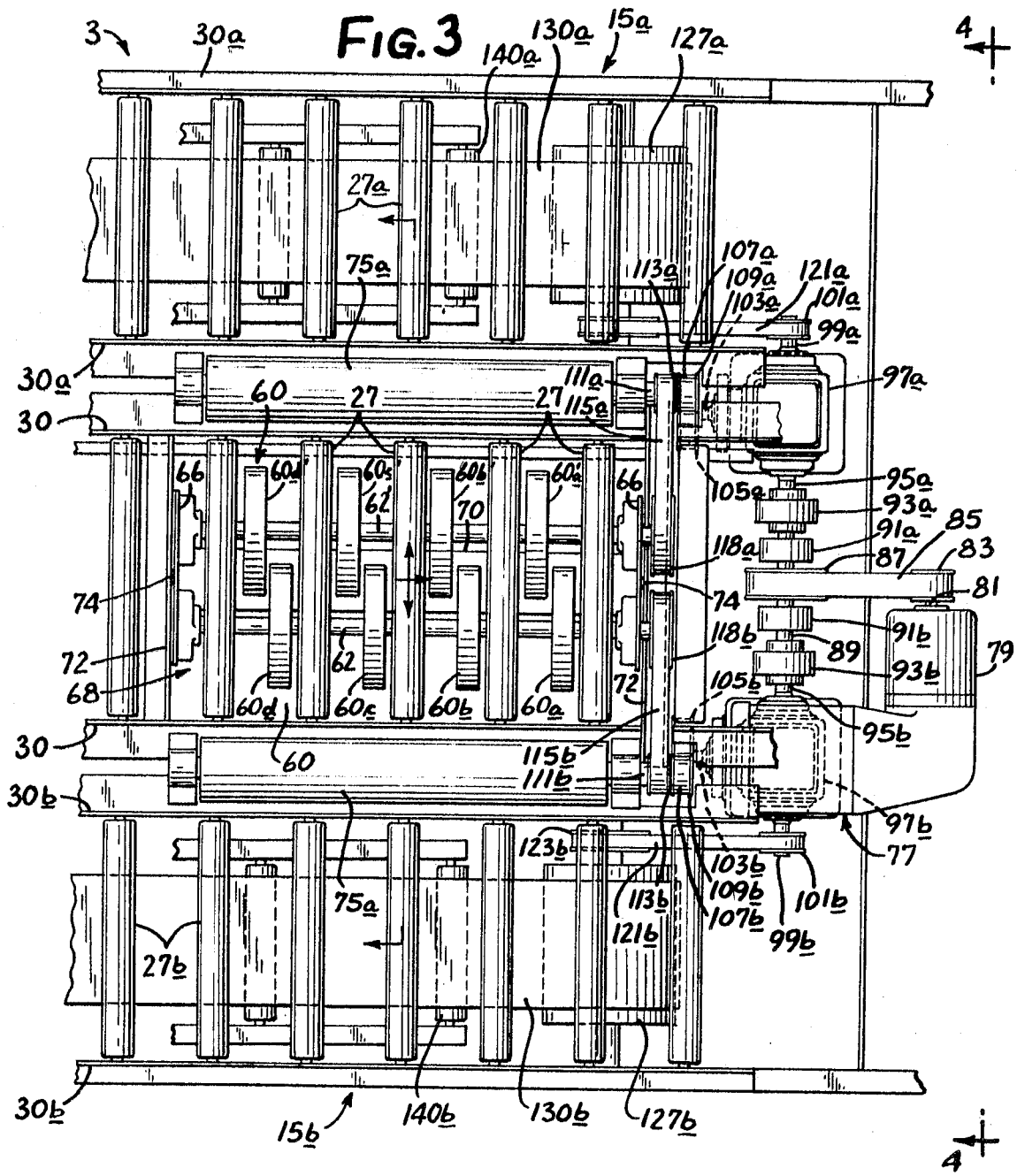

INVENTOR
WILLIAM J. BURGIS by Wallenstein, Spangenberg,
Hattis & Strampel ATTYS.

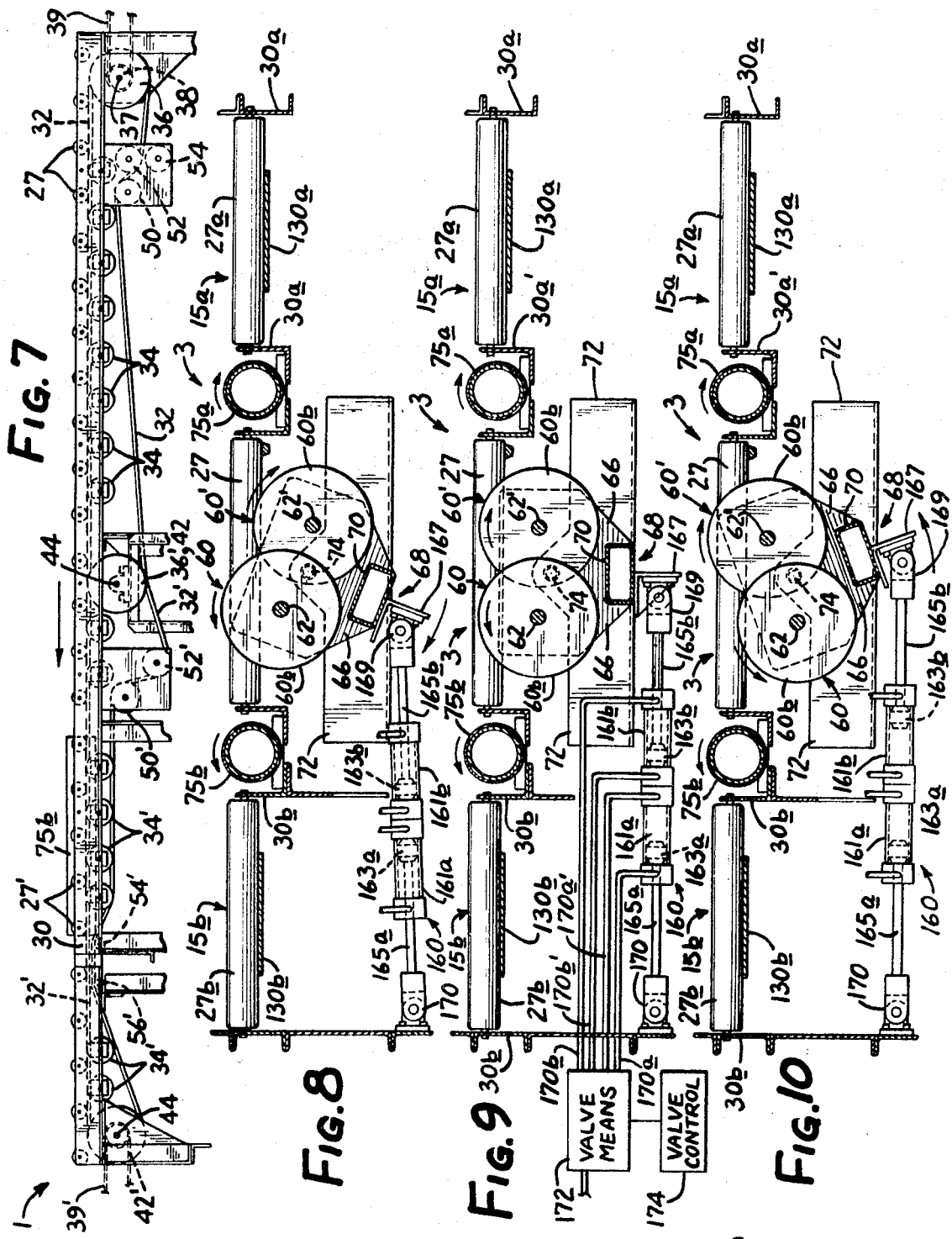

APPARATUS FOR DISCHARGING ARTICLES FROM A MOVING CONVEYOR

The present invention relates to apparatus for diverting an article from a moving conveyor. It has its most, although not its only, application in a conveyor system wherein an article may be diverted to one side or the other of a main conveyor at any one of a number of selected diverting stations therealong.

For discharging articles at a selected point along a conveyor, it is common to provide a reciprocating article pushing member positioned on the side of the conveyor opposite each article receiving point therealong which member is reciprocated to push the article partly or completely off the opposite side of the conveyor. When the article is pushed partly off the conveyor by the article pushing member, it may be completely removed therefrom by an auxiliary article impelling means, such as by a longitudinally extending continuously driven roller positioned between the conveyor and the article receiving point involved.

Another means for diverting articles at selected points along a conveyor includes a guide rail which is normally positioned on one side of the conveyor and is momentarily moved into position over the conveyor to guide an article off the conveyor.

The use of these article diverting means provides a substantial limitation on the number of articles per minute which can be handled on such a conveyor system which depends upon the time it takes to move the pusher member or guide rail involved into an article diverting position over the conveyor and then to return the same to a position on the side of the conveyor. Furthermore, since such an article pushing member or guide rail initially located on one side of the conveyor is generally positioned at all times above the level of the conveyor to minimize the distance over which it must be moved, it is not readily possible to provide receiving points on both sides of a given point of the conveyor since the article pushing member or guide rail involved would obstruct the movement of an article to one of the potential article receiving points referred to.

One of the objects of the invention is to provide apparatus for laterally diverting articles on a moving conveyor and which is constructed so that it can be moved into and out of its operative position in a much shorter time than is readily possible using the aforementioned prior article diverting means, so that the conveyor can reliably handle a larger number of articles per minute.

Another object of the present invention is to provide article diverting apparatus as just described which can be used selectively to divert articles to any one of two article receiving points located on opposite sides of the same point along a conveyor.

Still another object of the invention is to provide article diverting apparatus for the purpose just described which requires much less power to operate than is needed to operate the aforesaid prior article diverting means.

An overall object of the invention is to provide article diverting apparatus preferably satisfying all of the aforementioned objectives.

In accordance with one of the features of the invention, at each article diverting or discharge station along a conveyor there is provided diverting apparatus comprising a rocker frame supported below the diverting station for rocking motion along an axis extending generally longitudinally of the conveyor. The rocker frame carries at least one article impelling means, which is preferably a set of longitudinally spaced friction wheels extending transversely of the conveyor and rotating along a common longitudinally extending axis. The upper portions of the article impelling means on the frame are continuously driven in q direction to impel articles to the associated article receiving point. Where there are two article receiving points on opposite sides of the conveyor at each diverting station, there are a pair of such article impelling means positioned on opposite sides of the pivot axis of the rocker frame and continuously driven in opposite directions respectively for diverting articles to said article receiving points. The frame carrying the article impelling means preferably has a balanced position where the upper portions of each article impelling means are positioned a relatively short distance below the conveyor involved so that they are out of contact with the articles moving on the conveyor. A slight rocking motion applied to the rocker frame in one direction moves the frame to an operative position which raises an article impelling means above the level of the conveyor where it engages the bottom of an article thereon to impel the same from the conveyor to an article receiving point. Where a pair of article impelling means as described are provided, a slight rocking motion applied to the rocker frame in the opposite direction moves the frame to an opposite operative position which raises the other article impelling means above the level of the conveyor to engage the article thereon to impel the article from the conveyor to the other article receiving point. Because of the small amount of motion needed to move the rocker frame between an inoperative and operative position or between its opposite operative positions, a diverting operation can be carried out in a very short time so the conveyor can handle a relatively large number of articles per minute and requires only a small amount of driving power to move the rocker frame.

The above and other objects, advantages and features of the invention will become apparent upon making reference to the specification to follow, the claims, and the drawings wherein:

FIG. 1 is a plan view of one section of a recirculating conveyor system which section includes an article diverting station and associated article diverting apparatus including the features of the present invention;

FIG. 2 is a side elevational view of the conveyor apparatus shown in FIG. 1;

FIG. 3 is a greatly enlarged plan view of the diverting station shown in FIG. 1, with a part of the main conveyor thereof removed to expose motion imparting apparatus positioned below the main conveyor;

FIG. 7 is a longitudinal sectional view through the conveyor apparatus shown in FIG. 1, taken along section line 7—7 therein;

FIG. 8 is a somewhat enlarged, fragmentary, transverse, sectional view through the conveyor apparatus shown in FIG. 1, taken along section line 8—8 therein, and shows the article diverting mechanism thereof when it is operated to divert an article to one of the auxiliary conveyors shown in FIG. 1;

Figure 4:
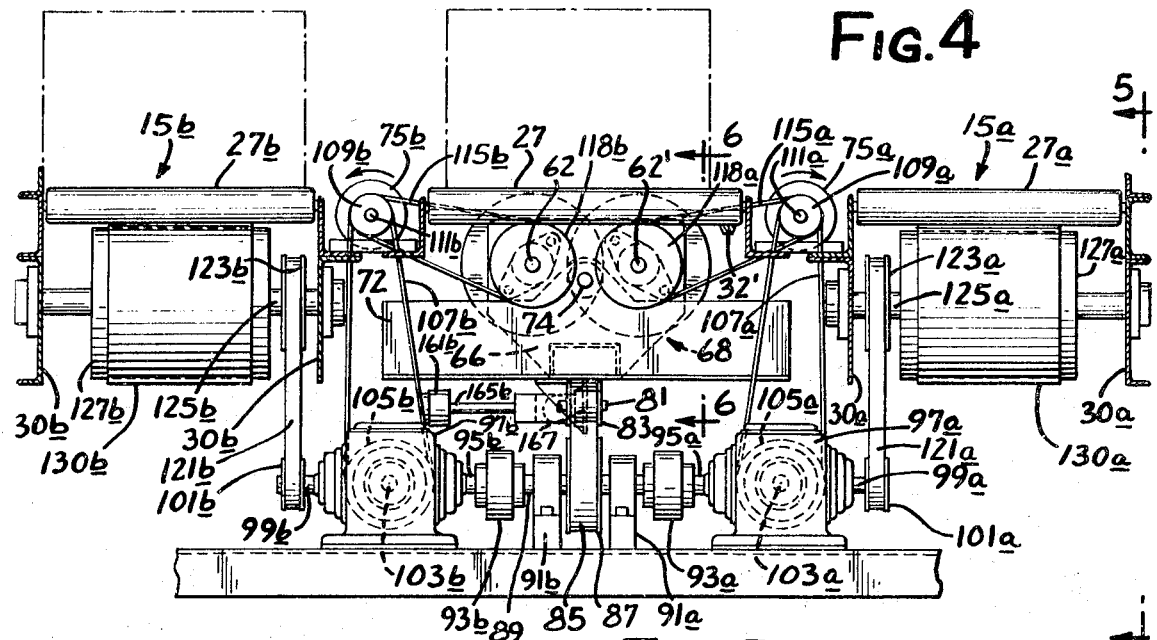
FIG. 4 is a side elevational view, drawn to reduced scale, of the conveyor apparatus shown in FIG. 3 as seen along the viewing plane 4—4 shown in FIG. 3.

FIG. 9 is a view corresponding to FIG. 8 showing the article diverting mechanism in its initial inoperative position where articles move past the diverting section are not affected by the diverting mechanism and a diagrammatic representation of valve and valve control means used to operate the diverting mechanism; and FIG. 10 is a view corresponding to FIGS. 8 and 9 showing the article diverting apparatus mechanism when it is operated to divert an article to the other auxiliary conveyor shown in FIG. 1.

Refer now more particularly to FIG. 1 where there is shown a section 1 of a main recirculating (loop) conveyor having an article diverting station identified by reference numeral 3 at which articles can be selectively permitted to continue in a forward direction shown by arrow 5 on the main recirculating conveyor or selectively diverted in lateral directions identified by arrows 7 and 9 to respective article receiving points identified by reference numerals 11a and 11b which constitute inlet points for auxiliary conveyors identified respectively by reference numerals 15a and 15b. The main recirculating conveyor can have a large number of diverting stations like diverting station 3 at which articles can be selectively diverted in one direction or the other to auxiliary conveyors like 15a and 15b under manual or automatic control. The illustrated auxiliary conveyors 15a and 15b respectively extend parallel to the main conveyor 1 and impel articles delivered to the article-receiving points 11a and 11b in the respective directions indicated by arrows 19 and 21 respectively to discharge points 23a and 23b at the ends thereof where the article may be discharged upon another conveying means (not shown) or upon a stationary article receiving surface (not shown).

Although the main conveyor section 1 and the auxiliary conveyors 15a and 15b could have other constructions, as illustrated they are conventional roller conveyors respectively comprising longitudinally spaced continuously driven rollers 27, 27a and 27b. The rollers 27 of the main conveyor section are rotatably supported between side frame members 30—30. The rollers 27a and 27b of the auxiliary conveyors 15a and 15b are respectively rotatably supported between side frame members 30a—30a and 30b—30b.

As best shown in FIGS. 1 and/or FIG. 7, the first group of rollers 27 of the main conveyor section 1 are continuously driven by a belt 32 engaging the bottom surfaces of the rollers 27. The belt 32, which is located to one side of the rollers 27, is pressed against the bottom surfaces of the rollers 27 by longitudinally spaced pressure-applying pulleys 34 respectively positioned between adjacent pairs of the rollers 27. One end of the belt 32 extends around a drive pulley 36 mounted on a shaft 37, in turn, driven by a sprocket 38 receiving a chain 39 extending from another section of the conveyor. The other end of the belt 32 extends around a pulley 42 secured to a shaft 44 carrying another pulley 36' around which extends another belt 32' which drives a second group of rollers 27'. The belt 32' drives the second group of rollers 27' in the same manner as the belt 32 drives the first group of rollers 27, that is, by engaging the bottom surfaces thereof under the force of applying pulleys 34'. The belt 32' extends around a pulley 42' on a shaft 44' carrying a sprocket receiving a chain 39' extending to the next section of the main conveyor. The bottom section of the belt 32 is guided between the pulleys 36 and 42 by suitable guide rollers 50, 52 and 54. The bottom section of the belt 32' is guided between the pulleys 36' and 42' by suitable guide rollers like 50', 52', 54' and 56'.

The details of the main conveyor section 1 described up to this point are common in roller conveyor systems generally. The unique features of the present invention deal with the manner in which an article at the diverting station 3 is selectively directed to the right or to the left of the main conveyor section 1 upon the auxiliary conveyors 15a and 15b.

Referring now more particularly to FIGS. 3, 4, 6 and 8 through 10, the mechanism for diverting the articles at the diverting station 3 include first and second article impelling means 60 and 60' each most advantageously comprising longitudinally spaced friction wheels 60a, 60b, 60c and 60d or 60a', 60b', 60c' and 60d' secured to a common continuously driven shaft 62 or 62' extending between end plates 66—66 of a rocker frame generally indicated by reference numeral 68. The end plates 66—66 of the rocker frame assembly 68 are interconnected in any suitable way such as by a cross frame unit 70. The end plates 66—66 are pivotally supported to adjacent stationary frame members 72—72 so that the rocker frame assembly and the article impelling means carried thereby are rockable or pivotable about a pivot axis 74 preferably centered beneath the diverting station 3 of the main conveyor section 1. As best shown in FIG. 3, the corresponding friction wheels 60a—60a', 60b—60b', 60c—60c' and 60d—60d' of the impelling means 60 and 60' are positioned in longitudinally spaced and overlapping relationship in the respective spaces between the adjacent pairs of the rollers 27 of the main conveyor section 1. As shown in FIG. 9, the two sets of friction wheels are centered on opposite sides of the pivot axis 74 of the rocker frame 68 to form a balanced frame where the upper extremities of the friction wheels are positioned slightly below the common plane intersecting the upper extremities of the rollers 27 at the article diverting station 3. As shown in FIG. 10, with this arrangement a slight rocking of the rocker frame 68 to the right will bring the upper extremities of the set of friction wheels 60a', 60b', 60c' and 60d' rotating in a clockwise direction slightly above the tops of the rollers 27, so that the friction wheels will engage an article moving upon the diverting station 3 to impel the article to the right as viewed in FIG. 10. The other set of friction wheels 60a, 60b, 60c and 60d are rotated in a counterclockwise direction so that when the rocker frame is pivoted slightly to the left, as seen in FIG. 8, the friction wheels 60a, 60b, 60c and 60d will be brought above the level of the rollers 27 to engage the bottom of an article at the diverting station 3 and impel the same to the left as viewed in FIG. 8. Continuously, oppositely rotating article takeoff rollers 75a–75b are positioned on opposite sides of the main conveyor section 1 at the diverting station 3, the upper extremity of the rollers 75a–75b being above the level of the rollers 27 where they receive initially the leading edge of the article being impelled in the direction thereof by the article diverting means described, completely to remove the article from the main conveyor section and to bring the same upon the auxiliary conveyors 15a and 15b.

In order to insure the immediate diversion of articles moving at a relatively high speed upon the article diverting station 3 of the main conveyor section 1, the friction wheels 60a, 60b, 60c, 60d, 60a', 60b', 60c' and 60d' have peripheral surfaces made of a material like polyurethane which has a high coefficient of friction relative, for example, to a material like cardboard out of which boxes are conventionally made. The surfaces of the auxiliary rollers 75a and 75b may also be made of such a high-friction material. The various rollers 27, 27a and 27b of the main auxiliary conveyors described may be conventional stainless steel or aluminum rollers.

Figure 5:
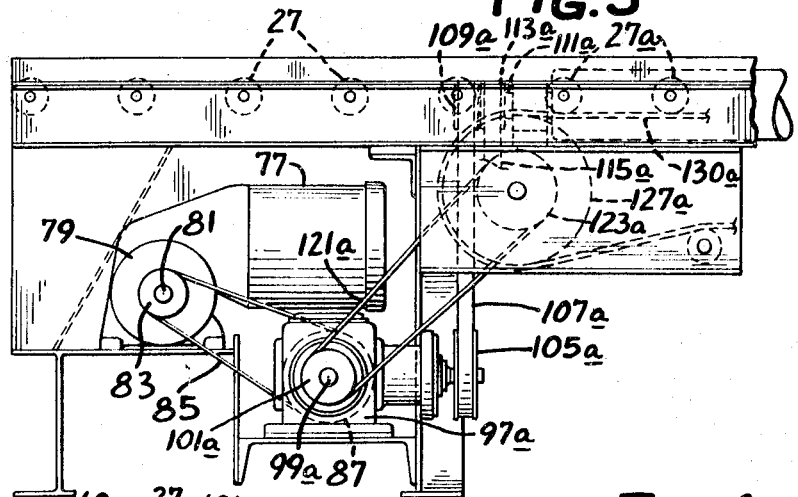
FIG. 5 is a side elevational view of the conveyor apparatus equipment shown in FIG. 2 as seen along the viewing plane 5—5 in FIG. 4.
Figure 6:
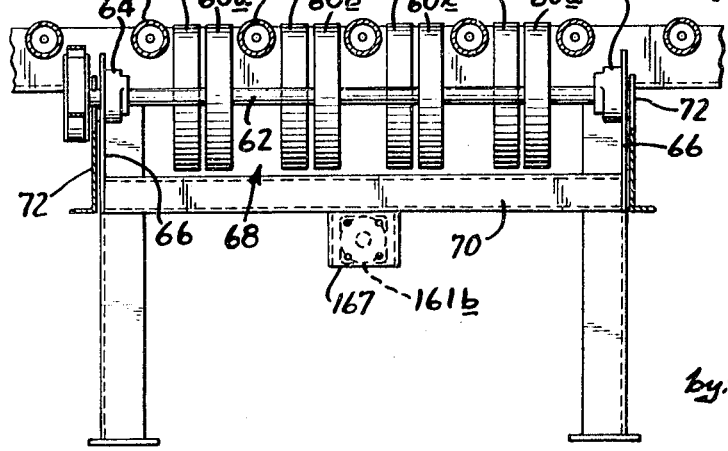
FIG. 6 is a longitudinal vertical sectional view through the conveyor apparatus of FIG. 4, taken along section line 6—6 therein.

The source of drive power for the friction wheels 60a, 60b, etc., and for the rollers 27a and 27b of the auxiliary conveyors 15a and 15b as shown in the drawings is a suitable electric motor 77 (see FIGS. 2, 3 and 5). The motor 77 drives a speed reducer 79 having an outlet shaft 81 carrying a pulley 83 driving belt 85. The belt 85 extends around a pulley 87 secured to a shaft 89. The shaft 89 is supported in bearings 91a–91b (FIGS. 3 and 4) on opposite sides of the pulley 87 and is secured to couplings 93a–93b respectively carried by shafts 95a–95 extending from gearboxes 97a–97b respectively having output shafts 99a–99b extending transversely of the main conveyor section 1 and carrying pulleys 101a–101b. The gearboxes 97a–97b also have output shafts 103a–103b extending longitudinally of the main conveyor section 1 which carry pulleys 105a–105b. The pulleys 105a–105b receive belts 107a–107b extending around pulleys 109a–109b secured to shafts 111a and 111b secured to or forming an extension of the takeoff rollers 75a–75b. The shafts 111a–111b also carry pulleys 113a–113b driving belts 115a–115b extending to pulleys 118a–118b secured to the ends of the shafts 62—62' of the two sets of friction wheels 60a, 60b etc., and 60a', 60b' etc. The belts 118a–118b have sufficient flexibility to effect a continuous unhindered driving of the pulleys 118a–118b which move up and down with respect to the stationary portions of the drive system being described as the rocker frame 68 is rocked back and forth in the manner previously described.

The aforementioned pulleys 101a–101b carried on the respective transversely extending shafts 99a–99b receive belts 121a–121b extending to pulleys 123a–123b secured to shafts 125a–125b journaled between the side frame members 30a—30a and 30b—30b respectively of the auxiliary conveyors 15a and 15b. The shafts 125a–125b carry relatively wide drums 127a–127b around which extend relatively wide roller drive belts 130a–130b. As best shown in FIG. 3, the belts 130a–130b extends beneath the rollers 27a–27b of the auxiliary conveyors 15a–15b to drive the same in the direction to carry articles delivered to the inlet ends thereof to the outlet or discharge ends 23a–23b thereof. The belts 130a–130b are urged by separate rollers 140a-140b against the bottom surfaces of the rollers 27a-27b to impart rotation to the rollers in the well-known manner. The outlet end of the belts 130a-130b extend around end pulleys 127a'-127b' (FIG. 1) and the bottom section of the belts 130a-130b are guided by suitable guide rollers, such as rollers 142, 144, 148, 149, 150, 152 and 154 best shown in FIG. 2.

Refer now to FIGS. 8 through 10 which shows the preferred manner in which the rocker frame 68 is rocked back and forth from the neutral balanced position shown in FIG. 9. The means illustrated are hydraulic means generally indicated by reference numeral 160 which includes cylinders 161a and 161b containing pistons 163a and 163b. The cylinders 161a and 161b are secured together in fixed axial relation so axial movement of the cylinder 161a will impart a similar axial movement of the cylinder 161b. The piston 163b within the cylinder 161b has a piston rod 165b secured to a bracket 167 through a clevislike coupling 169. The bracket 167 is secured to the boxlike cross frame unit 70 of the rocker frame 68. The piston 163a within the cylinder 161a has a piston rod 165a extending between the piston 163a and an anchored clevislike coupling 170. When pressure is applied to the left-hand end of the cylinder 161a, the pressure moves the cylinder 161a to the left relative to the piston 163a (which is a substantially stationary element in this hydraulic system). When pressure is applied to the right end of the cylinder 161a, the reaction against the piston 163a will move the cylinder 161a to the right.

When pressure is applied to the left-hand end of the other cylinder 161b, the associated piston 163b will move to the right and when pressure is applied to the right-hand end of the cylinder 161b, the piston 163b will be moved to the left. Hydraulic lines 170a and 170a' respectively extend to the left- and right-hand ends of the cylinder 161a, and hydraulic lines 170b and 170b' respectively extend to the right- and left-hand ends of the cylinder 161b. These hydraulic lines extend from a suitable valve assembly 172 which is controlled by suitable valve control means 174 under manual or automatic control to select the particular hydraulic lines which receive pressure to move the cylinder 161a or piston 163b in various combinations of movement to operate the rocker frame 68 between its centered balanced position shown in FIG. 9, and the left- or right-hand tilted positions shown in FIGS. 8 and 10. Thus, as shown in FIG. 9, when the cylinder 161a is moved to its right-hand position and the piston 163b of the cylinder 161b is moved to its left-hand position, the rocker assembly is in its inoperative or neutral position. As shown in FIG. 8, when the cylinder 161a is moved to its left-hand position and the piston 163 is moved to its left-hand position the piston rod 165b is in its fully retracted position where the rocker frame 68 is pulled to the left of its neutral position to raise the friction wheels 60a', 60b', 60c' and 60d' above the level of the rollers 27 at the diverting station 3 to impel articles toward the auxiliary conveyor 15b. When the cylinder 161a is moved to its right-hand position and the piston 163b is moved to its right-hand position, the piston rod 165b is in its fully extended position where it rocks the rocker frame assembly to the right to raise the frictional wheels 60a, 60b, 60c, and 60d above the level of the rollers 27 to impel the articles toward the auxiliary conveyor 15a.

The operation of the valve control means 174 may be accomplished in any suitable way. For example, the articles can be marked with code numbers designating a given auxiliary conveyor to which it is to be diverted and a code reader (not shown) in advance of each diverting station responds to the code number assigned to one of the auxiliary conveyors by operating the valve control means 174 accordingly. However, since the manner in which the valve control means is operated forms no part of the invention, no useful purpose is served in further describing the same.

It should be apparent that the various features of the article diverting system just described results in a very fast operating and reliable means for controlling the diversion of articles at any of a number of selected diversion stations in a conveyor. It should be understood that numerous modifications may be made in the specific and preferred form of the invention described above without deviating from the broader aspects of the invention.

I claim:

1. In a conveyor system which directs articles along a given path and includes at least one article diverting station at which articles are to be selectively diverted to one lateral side or the other to one or the other of a pair of article receiving points, said conveyor system at said diverting station providing spaced coplanar support points for articles moving forwardly onto the diverting station, the improvement in means for laterally diverting an article on said diverting station selectively to one or the other of said article receiving points comprising: a frame supported for rocking moving about an axis extending generally longitudinally of said path below said diverting station, first article impelling means carried on said rocker frame on one side of said axis thereof, second article impelling means carried on said rocker frame on the other side of said axis thereof, said first article impelling means having uppermost portions moving laterally outwardly toward one of said article receiving points on one side of said diverting station, said second article impelling means having uppermost portions moving laterally toward the other article receiving point on the other side of said diverting station, said frame having a first operative position where the uppermost portions of one of said article impelling means are positioned below the plane of said article support points and the uppermost portions of the other article impelling means are positioned above the plane of said article support points at said diverting station and a second operative position where the uppermost portions of said one article impelling means are positioned above said plane of said article support points and the uppermost portions of said other article impelling means are positioned below said plane, and means for selectively rocking said frame to either of said operative positions so articles can be selectively diverted to either one of said article receiving points on the opposite lateral sides of said conveyor path.

2. The conveyor system of claim 1, wherein said diverting station provides longitudinally spaced support points with openings therebetween, and said first and second article impelling means each includes first and second sets of longitudinally spaced article impelling elements which are moved upwardly between said spaces to contact longitudinally spaced points on the bottom of the article on the diverting station of the conveyor.

3. The conveyor system of claim 1, wherein the frame has an initial inoperative position where the upper portions of said first and second article impelling means are both initially immediately below said plane of said spaced support points, so said articles selectively can be directed forwardly past said diverting station instead of being diverted to one side or the other thereof.

4. The conveyor system of claim 3, wherein said frame is balanced in said initial inoperative position so only a modest force is required to rock the same between said inoperative and either operative position.

5. The conveyor system of claim 2, wherein said longitudinally spaced support points at said diverting station are the upper surfaces of continuously driven longitudinally spaced rollers rotating about axes extending transversely to the direction of movement of the article to and past said diverting station.

6. The conveyor system of claim 2, wherein said sets of article impelling elements respectively are friction wheels mounted for rotation along respective axes extending parallel to and located on opposite sides of the rocking axis of said frame.

7. The conveyor system of claim 5, wherein said sets of article impelling elements respectively are friction wheels mounted for rotation along respective axes positioned between said drive rollers.

8. The conveyor system of claim 6, wherein said longitudinally spaced support points at said diverting station are the upper surfaces of continuously driven longitudinally spaced rollers rotating about axes extending transversely to the direction of movement of the articles to said diverting station, and the corresponding pairs of friction wheels of said first and second set of article impelling means are respectively positioned in the same space between an adjacent pair of said rollers.

9. The conveyor system of claim 8, wherein said pairs OF friction wheels are in longitudinally spaced, overlapping relation.

* * * * *